United States Patent
Tsai et al.

(10) Patent No.: US 7,221,930 B2
(45) Date of Patent: May 22, 2007

(54) CELLULAR PHONE CAPABLE OF DETECTING COUNTERFEIT CURRENCY OR LIGHTING AND METHOD OF THE SAME

(75) Inventors: Tony Tsai, Taipei Hsien (TW); David Ho, Taipei Hsien (TW); Ling Zhang, Shanghai (CN)

(73) Assignee: Inventec Appliances Corp., Taipei Hsien (TW)

(*) Notice: Subject to any disclaimer, the term of this patent is extended or adjusted under 35 U.S.C. 154(b) by 408 days.

(21) Appl. No.: 10/873,193

(22) Filed: Jun. 23, 2004

(65) Prior Publication Data

US 2005/0287960 A1    Dec. 29, 2005

(51) Int. Cl.
*H04M 1/66* (2006.01)
*H04M 1/68* (2006.01)
*H04M 3/16* (2006.01)

(52) U.S. Cl. .................. 455/410; 455/411; 455/90.1; 455/566; 455/406; 455/414.1; 455/575.8; 455/85; 379/112.01; 379/91.01; 235/449; 235/451; 250/461.1

(58) Field of Classification Search .............. 455/406, 455/410, 566, 550.1, 85, 414.1, 411, 419, 455/558, 90.1, 575.8; 379/112.01, 91.01; 324/228, 235

See application file for complete search history.

(56) References Cited

U.S. PATENT DOCUMENTS

| | | | | |
|---|---|---|---|---|
| 5,822,691 A | * | 10/1998 | Hosseini | 455/410 |
| 5,903,824 A | * | 5/1999 | Ruhl et al. | 455/186.1 |
| 5,918,960 A | * | 7/1999 | Hopwood et al. | 356/71 |
| 5,942,759 A | * | 8/1999 | Romano | 250/461.1 |
| 6,047,196 A | * | 4/2000 | Makela et al. | 455/556.1 |
| 6,070,066 A | * | 5/2000 | Lundborg et al. | 455/406 |
| 6,206,283 B1 | * | 3/2001 | Bansal et al. | 235/379 |
| 6,254,249 B1 | * | 7/2001 | Kim et al. | 362/109 |
| 6,308,087 B1 | * | 10/2001 | Aoshima | 340/7.28 |
| 6,600,919 B1 | * | 7/2003 | Kawase | 455/414.1 |
| 6,788,962 B2 | * | 9/2004 | Cha | 455/566 |
| 6,795,173 B2 | * | 9/2004 | Romano et al. | 356/71 |
| 7,096,003 B2 | * | 8/2006 | Joao et al. | 455/406 |

\* cited by examiner

Primary Examiner—Marceau Milord
(74) Attorney, Agent, or Firm—Bacon & Thomas, PLLC

(57) ABSTRACT

The present invention is to provide a cellular phone capable of detecting counterfeit currency or lighting comprising a counterfeit currency detection bulb, a lamp and a keypad, wherein the keypad includes a first dual key in association with the counterfeit currency detection bulb, a second dual key in association with the lamp and a plurality of third keys, such that in response to pressing the first dual key or the second dual key, the cellular phone activates the counterfeit currency detection bulb for detecting counterfeit currency or activates the lamp for lighting respectively.

6 Claims, 5 Drawing Sheets

CELLULAR PHONE CAPABLE OF DETECTING COUNTERFEIT CURRENCY OR LIGHTING AND METHOD OF THE SAME

FIELD OF THE INVENTION

The present invention relates to cellular phones, more particularly to a cellular phone capable of either detecting counterfeit currency or lighting and a method of detecting counterfeit currency or lighting by the cellular phone.

BACKGROUND OF THE INVENTION

The world we are living in has entered into a new era with both information technology and electronics being progressed rapidly. Thus, various kinds of information and electronic products are commercially available due to the fast progress in computer science and technology. The fast development of such new products brings a lot of convenience. In response to various kinds of new information and electronic products being developed, especially cellular phones, users become more critical with respect to the features and/or quality thereof. Thus, whether cellular phone manufacturers can provide a more convenient, effective, and friendly service to users in their products will be an indicator to decide whether the cellular phone manufacturing technology of one electronic company is more advanced than other competitive ones.

Many people have the experience of receiving counterfeit money. Such is bothersome. Upgrades in the counterfeiter's methods and techniques have also made the problem of cellular phone currency even worse. It is typical for a sales person to use a large counterfeit money detection device or a counterfeit money detection pen to authenticate a received currency bill. It is also typical that a flashlight is needed to light a door in a dark environment prior to correctly inserting a key into the keyhole of the lock on the door. However, carrying a flashlight is not a convenient thing. In this regard, for meeting the needs of the large cellular phone market and therefore hopefully increasing the share of the market, major cellular phone manufacturers spend a lot of time and money to develop quality cellular phones and powerful and multi-functional cellular phones with ergonomic design.

Thus, it is desirable among major cellular phone manufacturers and consumers to provide a cellular phone capable of either detecting counterfeit currency or lighting in addition to its default communication capability in order to overcome the above drawbacks of the prior art.

SUMMARY OF THE INVENTION

A primary object of the present invention is to provide a cellular phone which, in addition to its default communication capability, is able to detect counterfeit currency by activating a counterfeit currency detection bulb thereof or light by activating a lamp thereof and method of the same. The trend of developing cellular phones is slimness, compactness, and lightweight in consideration of weight and size. Additional provision of a counterfeit currency detection bulb and a lamp on a cellular phone will inevitably, undesirably increase the size or surface area thereof. The present invention is thus devised to avoid the above disadvantage by modifying the existing keys. By utilizing the present invention, a pressing of one of two dual keys will represent a predetermined meaning (e.g., number, alphabet, or instruction) thereof in a default state. Alternatively, a pressing or continuous pressing of the same dual key will represent an activation of either the counterfeit currency detection bulb or the lamp in a restricted state.

The above and other objects, features and advantages of the present invention will become apparent from the following detailed description taken with the accompanying drawings.

DETAILED DESCRIPTION OF THE PREFERRED EMBODIMENTS

Figure 1:
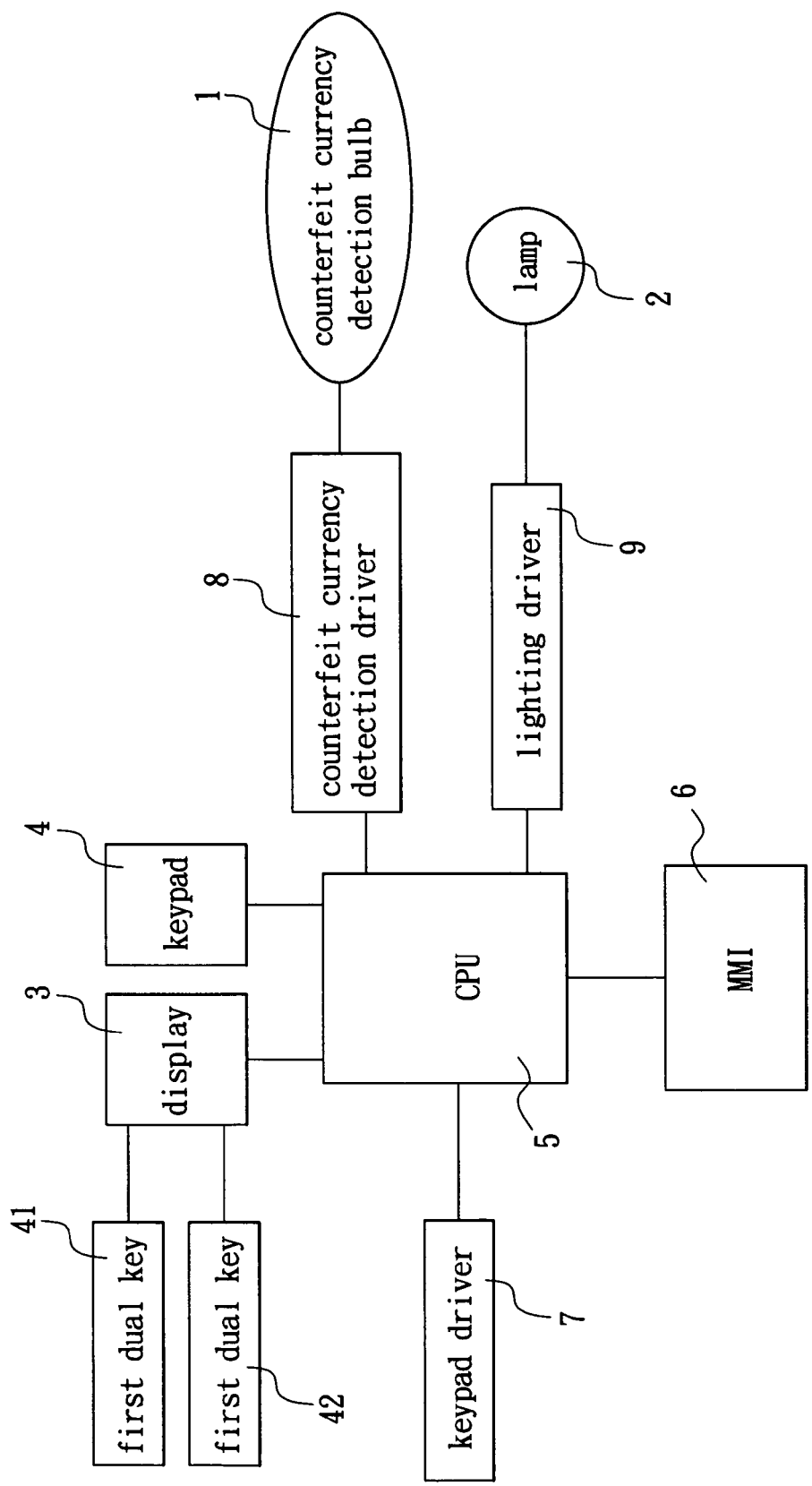
FIG. 1 is a schematic block diagram of a cellular phone according to the invention.

Referring to FIG. 1, there is shown a cellular phone capable of detecting counterfeit currency or lighting and method of the same in accordance with the invention. The cellular phone comprises a counterfeit currency detection bulb 1, a lamp 2, a display 3, and a keypad 4 on its top surface. The cellular phone further comprises a CPU (central processing unit) 5, a MMI (main machine interface) 6, a keypad driver 7, a counterfeit currency detection driver 8, and a lighting driver 9 all in its internal circuitry or as installed software. The keypad 4 comprises a first dual key 41 and a second dual key 42. A pressing of one of the dual keys 41 and 42 will represent a predetermined meaning thereof for communication in a default state. Alternatively, a pressing or continuous pressing of the same dual key 41 or 42 will represent an activation of the counterfeit currency detection bulb 1 or the lamp 2 in a restricted state as detailed below.

Referring to FIG. 1 again, the invention is applicable to a cellular phone having a hinged cover. In detail, the cellular phone comprises a phone body and a cover. One end of the phone body is hingedly coupled to one end of the cover. In one state, the cover can be pivoted to rest on the phone body for covering the keypad 4. On one side of the phone body, there are provided a volume increase key (i.e., the first dual key 41) and a volume decrease key (i.e., the second dual key 42). The volume increase key or the volume decrease key can be pressed to adjust volume of the cellular phone having a hinged cover when the cover of the cellular phone having a hinged cover is open. Alternatively, the volume increase key acts as a switch for activating the counterfeit currency detection bulb 1 or the volume decrease key acts as a switch for activating the lamp 2 when the cover of the cellular phone is pivoted to rest on the phone body. Operations of the activation of the counterfeit currency detection bulb 1 or the lamp 2 will be described by referring to FIGS. 2 and 3 below.

Figure 2:
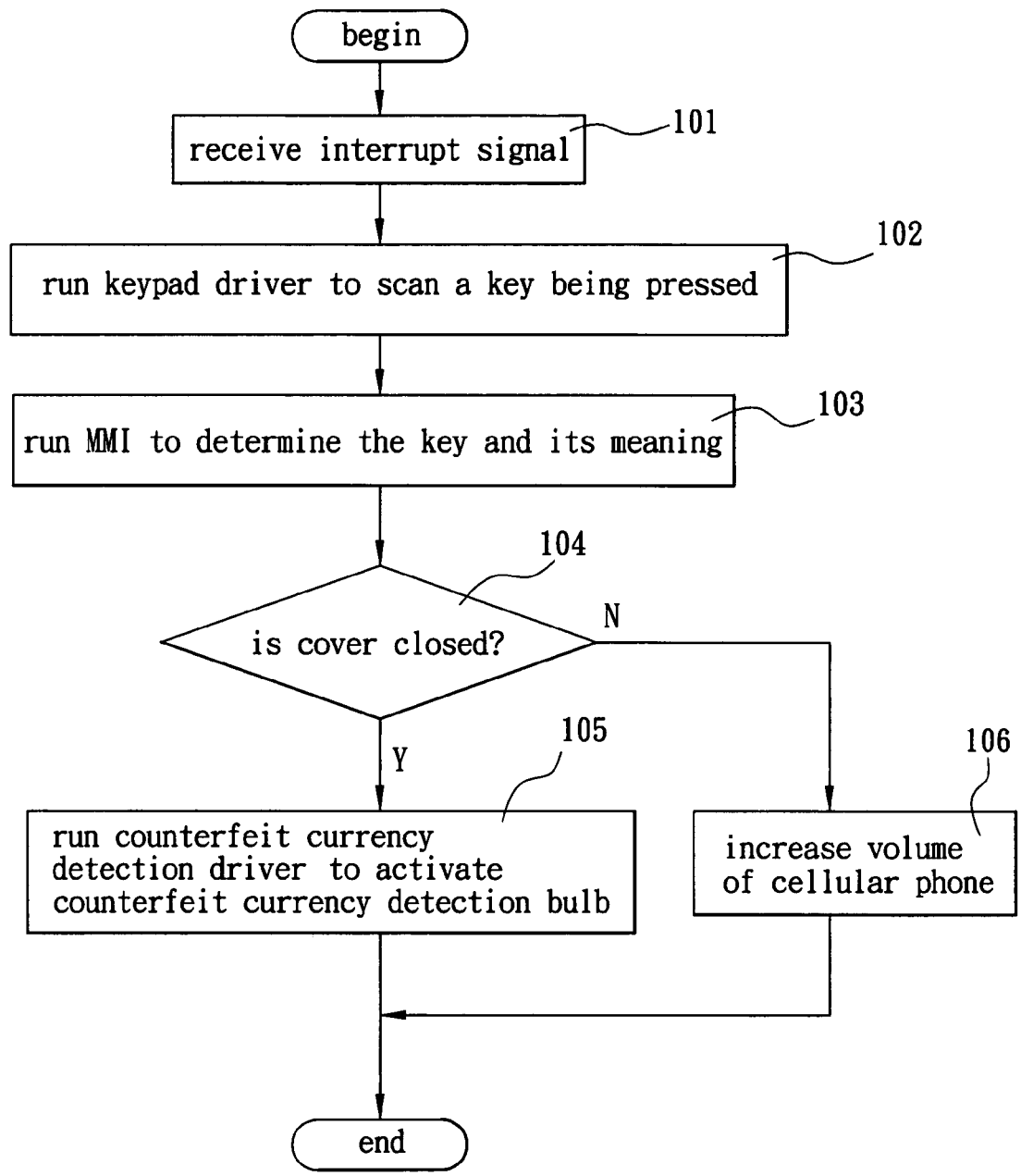
FIG. 2 is a flow chart illustrating a process of activating the counterfeit currency detection bulb of a cellular phone having a hinged cover according to the invention.

Referring to FIG. 2 in conjunction with FIG. 1, there is shown a flow chart illustrating a process of activating the counterfeit currency detection bulb 1 by the CPU 5 when the volume increase key is pressed according to a first preferred embodiment of the invention.

In step 101, an interrupt signal is received.

In step 102, run the keypad driver 7 to scan the key of the keypad 4 being pressed.

In step 103, run the MMI 6 to determine the key and the meaning thereof.

In step 104, it is determined whether the cover is rested on the phone body. If yes, the process goes to step 105. Otherwise, the process jumps to step 106.

In step 105, run the counterfeit currency detection driver 8 to activate the counterfeit currency detection bulb 1. The process ends.

In step 106, increase volume of the cellular phone having a hinged cover. The process ends.

Figure 3:
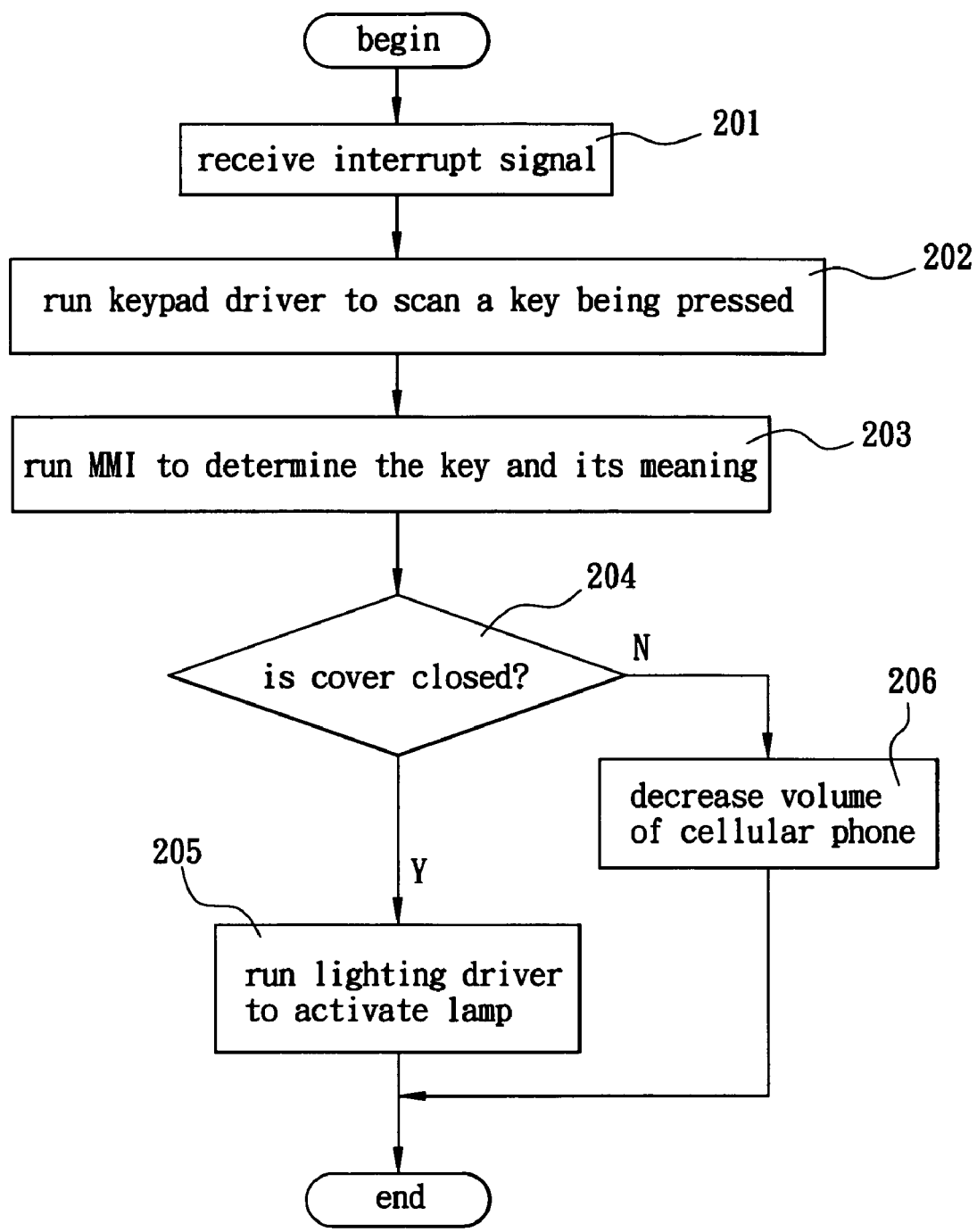
FIG. 3 is a flow chart illustrating a process of activating the lamp of the cellular phone having a hinged cover according to the invention.

Referring to FIG. 3 in conjunction with FIG. 1, there is shown a flow chart illustrating a process of activating the lamp 2 by the CPU 5 when the volume decrease key is pressed according to a second preferred embodiment of the invention.

In step 201, an interrupt signal is received.

In step 202, run the keypad driver 7 to scan the key of the keypad 4 being pressed.

In step 203, run the MMI 6 to determine the key and the meaning thereof.

In step 204, it is determined whether the cover is rested on the phone body. If yes, the process goes to step 205. Otherwise, the process jumps to step 206.

In step 205, run the lighting driver 9 to activate the lamp 2. The process ends.

In step 206, decrease volume of the cellular phone having a hinged cover. The process ends.

The invention is applicable to either a cellular phone having a hinged cover as above or a cellular phone without a cover as detailed below. The cellular phone comprises a phone body without a hinged cover. On a top surface of the cellular phone there are provided the display 3 and the keypad 4 including a "#" key (i.e., the first dual key 41) and a "*" (i.e., the second dual key 42). One pressing of the "#" or the "*" key will deactivate the pressing state thereof. The pressed "#" or the "*" key will be shown on the display 3. Operations of the activation of the counterfeit currency detection bulb 1 or the lamp 2 will be described by referring to FIGS. 4 and 5 below when the "#" or the "*" key is pressed continuously.

Figure 4:
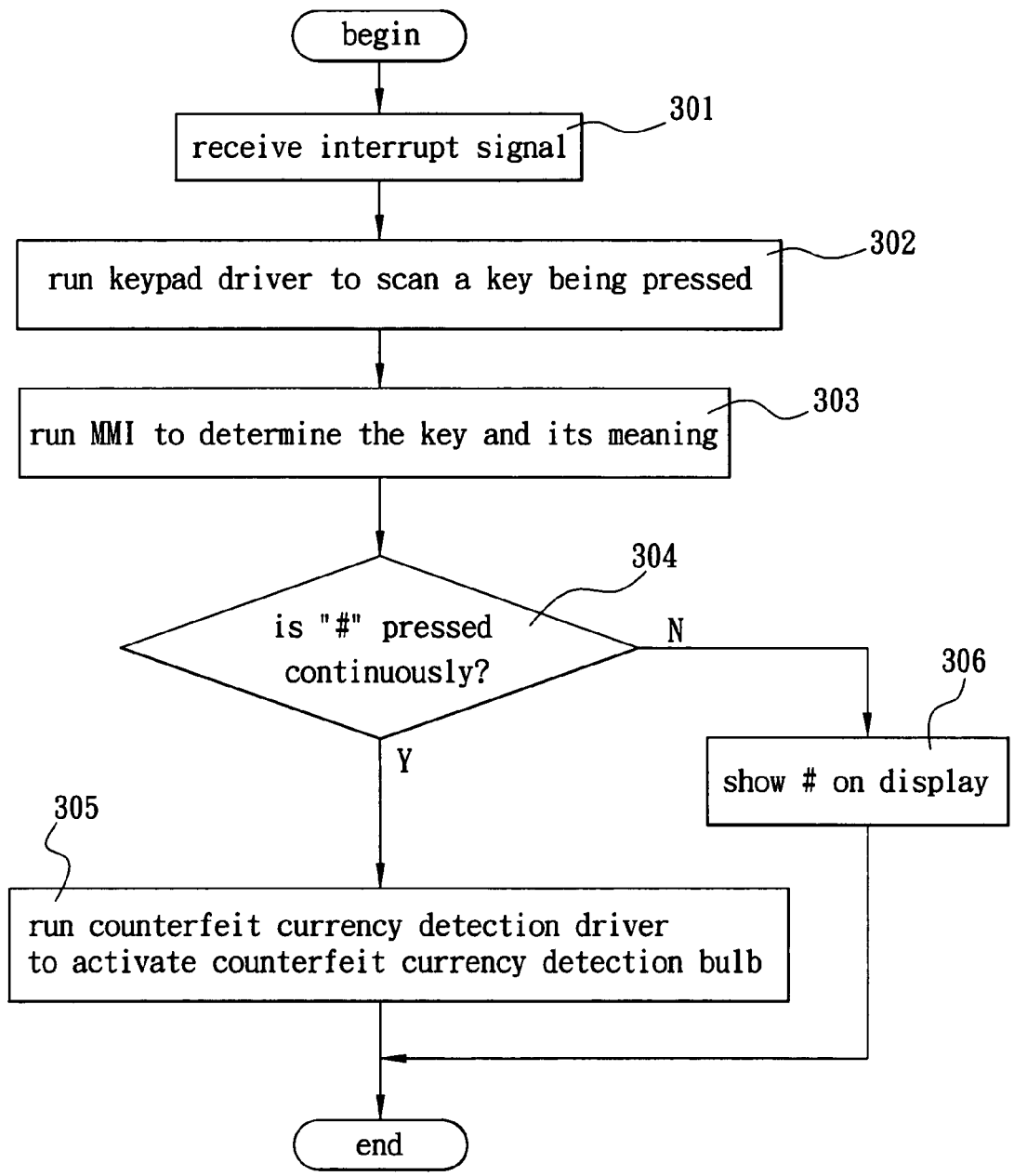
FIG. 4 is a flow chart illustrating a process of activating the counterfeit currency detection bulb of a cellular phone without a cover according to the invention.

Referring to FIG. 4 in conjunction with FIG. 1, there is shown a flow chart illustrating a process of activating the counterfeit currency detection bulb 1 by the CPU 5 when the "#" key is pressed according to a third preferred embodiment of the invention.

In step 301, an interrupt signal is received.

In step 302, run the keypad driver 7 to scan the key of the keypad 4 being pressed.

In step 303, run the MMI 6 to determine the key and the meaning thereof.

In step 304, it is determined whether the "#" key is pressed continuously. If yes, the process goes to step 305. Otherwise, the process jumps to step 306.

In step 305, run the counterfeit currency detection driver 8 to activate the counterfeit currency detection bulb 1. The process ends.

In step 306, show "#" on the display 3. The process ends.

Figure 5:
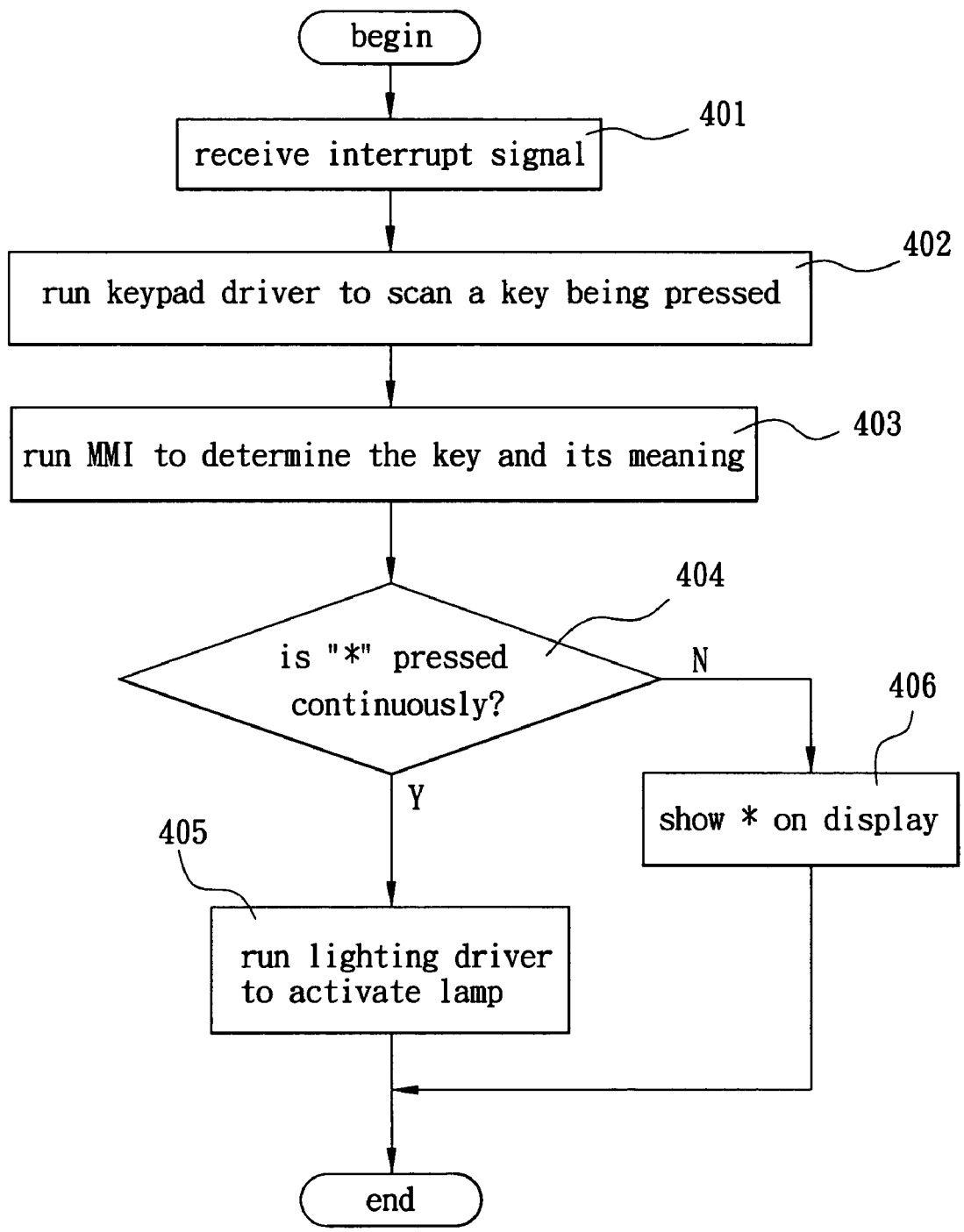
FIG. 5 is a flow chart illustrating a process of activating the lamp of the cellular phone without a cover according to the invention.

Referring to FIG. 5 in conjunction with FIG. 1, there is shown a flow chart illustrating a process of activating the lamp 2 by the CPU 5 when the "*" key is pressed according to a fourth preferred embodiment of the invention.

In step 401, an interrupt signal is received.

In step 402, run the keypad driver 7 to scan the key of the keypad 4 being pressed.

In step 403, run the MMI 6 to determine the key and the meaning thereof.

In step 404, it is determined whether the "*" key is pressed continuously. If yes, the process goes to step 405. Otherwise, the process jumps to step 406.

In step 405, run the lighting driver 9 to activate the lamp 2. The process ends.

In step 406, show "*" on the display 3. The process ends.

While the invention has been described by means of specific embodiments, numerous modifications and variations could be made thereto by those skilled in the art without departing from the scope and spirit of the invention set forth in the claims.

What is claimed is:

1. A method of either detecting counterfeit currency or lighting by means of a cellular phone including a counterfeit currency detection bulb, a lamp, a display, a CPU, an MMI, a keypad driver, a counterfeit currency detection driver, a lighting driver, and a keypad including a first dual key in association with a counterfeit currency detection bulb, a second dual key in association with a lamp, and a plurality of third keys so that either in response to pressing the first dual key, the CPU performs steps comprising:
   receiving an interrupt signal;
   running the keypad driver to scan the key being pressed;
   running the MMI to determine the key being pressed and a meaning thereof; and
   running the counterfeit currency detection driver to activate the counterfeit currency detection bulb;
   or in response to pressing the second dual key, the CPU performs steps comprising:
   receiving an interrupt signal;
   running the keypad driver to scan the key being pressed;
   running the MMI to determine the key being pressed and a meaning thereof; and
   running the lighting driver to activate the lamp,
   wherein the cellular phone is a hinge type of cellular phone include a phone body and a cover wherein one end of the phone body is hingedly coupled to one end of the cover so that in one state the cover is pivoted to rest on the phone body for covering the keypad, on one side of the phone body there are formed a volume increase key and a volume decrease key, and the volume increase key or the volume decrease key is operative to press to adjust a volume of the hinge type of cellular phone when the cover of the hinge type of cellular phone is open.

2. The method of claim 1, wherein in response to closing the cover on the phone body and pressing the volume increase key, the CPU performs steps comprising:
   receiving an interrupt signal;
   running the keypad driver to scan the key being pressed;
   running the MMI to determine the key being pressed and a meaning thereof;
   determining whether the cover is closed on the phone body or not;
   if the determination is positives running the counterfeit currency detection driver to activate the counterfeit currency detection bulb; and
   if the determination is negatives increasing the volume of the hinge type of cellular phone.

3. The method of claim 1, wherein in response to closing the cover on the phone body and pressing the volume increase key, the CPU performs steps comprising:

receiving an interrupt signal;
running the keypad driver to scan the key being pressed;
running the MMI to determine the key being pressed and a meaning thereof;
determining whether the cover is closed on the phone body or not;
if the determination is positives running the lighting driver to activate the lamp; and
if the determination is negative, decreasing the volume of the hinge type of cellular phone.

4. A method of either detecting counterfeit currency or lighting by means of a cellular phone including a counterfeit currency detection bulb, a lamp, a display, a CPU, an MMI, a keypad driver, a counterfeit currency detection driver, a lighting driver, and a keypad including a first dual key in association with a counterfeit currency detection bulb, a second dual key in association with a lamp, and a plurality of third keys so that either in response to pressing the first dual key, the CPU performs steps comprising:
receiving an interrupt signal;
running the keypad driver to scan the key being pressed;
running the MMI to determine the key being pressed and a meaning thereof; and
running the counterfeit currency detection driver to activate the counterfeit currency detection bulb;
or in response to pressing the second dual key, the CPU performs steps comprising:
receiving an interrupt signal;
running the keypad driver to scan the key being pressed;
running the MMI to determine the key being pressed and a meaning thereof; and
running the lighting driver to activate the lamp,
wherein the cellular phone is a coverless type of cellular phone including a phone body, on a surface of the cellular phone there are formed the display and the keypad including a "#" key, a "*" key, and the plurality of third keys, a pressing of the "#" or the "*" key deactivates the pressing state thereof with the pressed "#" or "*" key being shown on the display, and a continuous pressing of the "#" or "*" key activates the counterfeit currency detection bulb or the lamp respectively.

5. The method of claim 4, wherein in response to continuously pressing the "#" key, the CPU performs steps comprising:
receiving an interrupt signal;
running the keypad drive to scan the key being pressed;
running the MMI to determine the key being pressed and a meaning thereof;
determining whether the "#" key is pressed continuously or not;
if the determination is positive, running the counterfeit currency detection driver to activate the counterfeit currency detection bulb; and
if the determination is negative, showing "#" on the display.

6. The method of claim 4, wherein in response to continuously pressing the "*" key, the CPU performs the steps comprising:
receiving an interrupt signal;
running the keypad driver to scan the key being pressed;
running the MMI to determine the key being pressed and a meaning thereof;
determining whether the "*" key is pressed continuously or not;
if the determination is positive, running the lighting driver to activate the lamp; and
if the determination is negative, showing * on the display.

* * * * *